Feb. 23, 1954     S. ROKAHR     2,670,218
TELESCOPIC TUBULAR CYCLE FORK WITH FLATTENED LOWER ENDS
Filed July 30, 1952
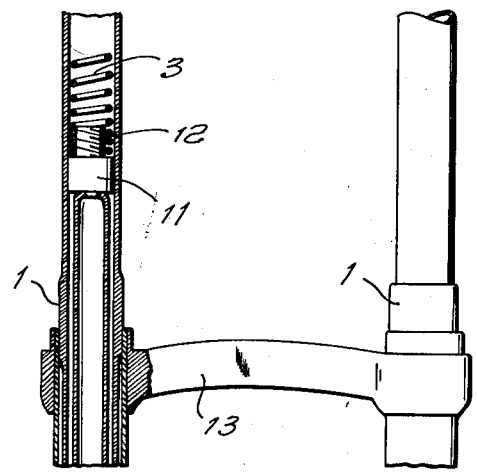
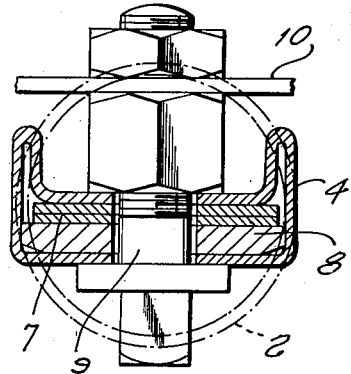
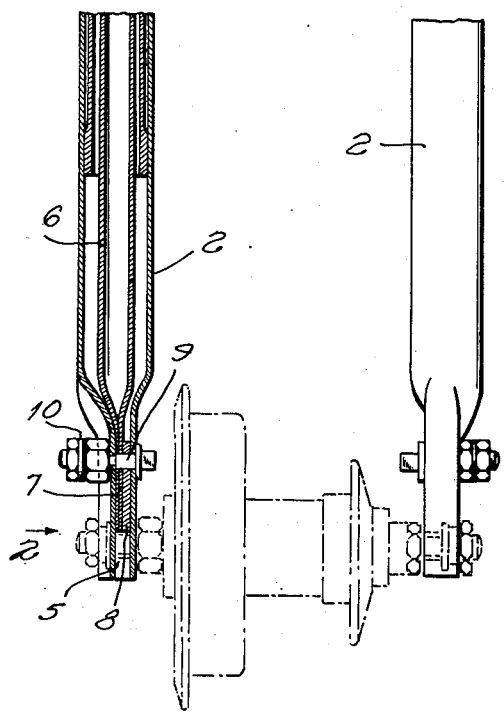
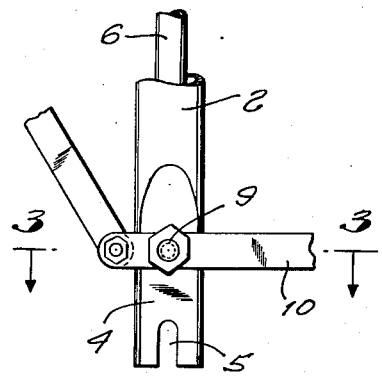
INVENTOR
SIEGFRIED ROKAHR
BY
ATTORNEY Patented Feb. 23, 1954

2,670,218

UNITED STATES PATENT OFFICE 2,670,218

TELESCOPIC TUBULAR CYCLE FORK WITH FLATTENED LOWER ENDS

Siegfried Rokahr, Stuttgart, Germany, assignor to Alfred Kreidler, Stuttgart-O, Germany Application July 30, 1952, Serial No. 301,694

Claims priority, application Germany August 17, 1951

1 Claim. (Cl. 280—276)

This invention concerns telescopic forks, especially for use as front wheel forks for light motor cycles or the like.

In the case of telescopic forks, such as used particularly as front wheel forks for motor cycles or the like, the lower, movable slide tubes must be provided with supporting surfaces or special supporting members for the springing and/or shock absorbing means disposed in the interior of the tubes.

An object of the invention is to provide a particularly simple way of fixing such supporting members in the interior of such sliding tubes.

According to the present invention, ends of the tubes carrying the wheel axle are compressed in a known manner to a U-shaped cross section in which the flattened ends of the supporting members are clamped.

As this construction results in comparatively narrow supporting surfaces in the fork ends for the wheel axle, it is preferable to connect the sliding tubes together in known manner by a bridge, in order to prevent the wheel axle from adopting a skew position due to unequal deflection of the two legs of the fork.

The invention will be described further by way of example with reference to the accompanying drawings, in which:

Fig. 1 is a longitudinal section through the lower part of a leg of a fork constructed in accordance with the invention;

Fig. 2 is a side elevation in the direction of the arrow II of Fig. 1; and

Fig. 3 is a cross section taken on the line III—III of Fig. 2, on a larger scale.

The telescopic fork consists of two fork legs, each comprising a stationary tube 1 and a sliding tube 2. Each stationary tube 1 is connected in the usual manner with the stationary tube of the other leg by means of cross pieces and with the steering tube. This connection is not shown in the drawings. A helical compression spring 3 is disposed in the usual manner between each stationary tube 1 and the corresponding sliding tube 2. The support of the compression spring 3 and any limited relative extension of the tubes is not shown in the drawings as it is unimportant for the invention. It may be sufficient for limiting the extension by securing both ends of the spring at their points of support so that the spring at the same time counteracts a too great extension in the shape of a tension spring.

Each sliding tube 2 is pressed at its end 4 into a U-shape and at the bottom it is provided with a slot 5 for receiving the wheel axle. A supporting tube 6 for the spring 3 is inserted with its flattened and compressed end 7 together with a washer 8 into the compressed end 4 of the fork and there it is clamped by a connection bolt 9. The connection bolt 9 may also serve for holding the struts 10 for the mudguard. A guide piston 11 is displaceable within the upper end of each supporting tube 6. Each piston has a spigot 12 provided with an external thread which engages the lower convolutions of the helical compression spring 3. For the purpose of the aforementioned limitation of the resilient extension the piston 11 may be firmly connected with the supporting tube; for instance it may be soldered or welded thereto.

The sliding tubes 2 of the two legs are preferably rigidly connected by a bridge 13 in order to prevent the wheel axle from adopting a skew position during deflection.

Obviously it is also possible to connect the piston of a friction or oil damper with the supporting tube.

The arrangement described above results in an extraordinary, simple, light and cheap construction of a telescopic fork, which is particularly suitable for light motor cycles.

The U-shaped pressing of the ends of the fork is known in itself, but only for unsprung bicycle rear forks, where there is no need to support the springing and/or shock absorbing means.

I claim:

In a telescopic fork, for mounting a wheel axle resiliently relative to a vehicle frame, especially for use as the front fork of a light motor cycle; a pair of lower sliding tubes pressed at the lower ends into a generally U-shaped cross-section to provide support for the wheel axle, a pair of upper tubes slidable on said lower tubes, springing means within each of said upper tubes, and an internal supporting member constituting a connection between each lower tube and each said springing means, each said member having a flattened lower end portion which is clamped within the pressed lower end of the corresponding lower sliding tube.

SIEGFRIED ROKAHR.

References Cited in the file of this patent

UNITED STATES PATENTS

| Number | Name | Date |
|---|---|---|
| 2,475,774 | Benson | July 12, 1949 |

FOREIGN PATENTS

| Number | Country | Date |
|---|---|---|
| 225,651 | Germany | Sept. 17, 1910 |
| 976,929 | France | Nov. 1, 1950 |